US010401193B2

(12) United States Patent
Mehnert et al.

(10) Patent No.: US 10,401,193 B2
(45) Date of Patent: Sep. 3, 2019

(54) INTEGRATED CIRCUIT ARRANGEMENT FOR A POSITION SENSOR USING HALL ELEMENTS

(71) Applicant: Avago Technologies International Sales Pte. Limited, Singapore (SG)

(72) Inventors: Walter Mehnert, Ottobrun (DE); Thomas Theil, Feldafing (DE)

(73) Assignee: Avago Technologies International Sales Pte. Limited, Singapore (SG)

( * ) Notice: Subject to any disclaimer, the term of this patent is extended or adjusted under 35 U.S.C. 154(b) by 154 days.

(21) Appl. No.: 15/278,251

(22) Filed: Sep. 28, 2016

(65) Prior Publication Data

US 2017/0089728 A1  Mar. 30, 2017

(30) Foreign Application Priority Data

Sep. 28, 2015 (DE) .......................... 10 2015 218 651
Oct. 7, 2015 (DE) .......................... 10 2015 117 067

(51) Int. Cl.
*G01D 5/14* (2006.01)

(52) U.S. Cl.
CPC .................... *G01D 5/145* (2013.01)

(58) Field of Classification Search
CPC ........ G01D 5/142; G01D 5/249; G01D 5/145; G01D 5/2454; G01D 5/2455; G01D 5/14;
(Continued)

(56) References Cited

U.S. PATENT DOCUMENTS 5,545,983 A * 8/1996 Okeya ...................... G01B 3/04
324/207.12
8,963,540 B2 * 2/2015 Reymond .............. G01D 5/145
324/207.11

(Continued)

FOREIGN PATENT DOCUMENTS

DE   10 2005 039 280 A1   2/2007
DE   10 2011 053 043 A1   2/2013

*Primary Examiner* — Jay Patidar
(74) *Attorney, Agent, or Firm* — Sheridan Ross P.C.

(57) ABSTRACT

The invention relates to an integrated circuit arrangement for a position sensor for measuring angles or distances, wherein the circuit arrangement comprises:
a measurement substrate, which defines a measurement plane and which is configured such that it comprises a plurality of corners;
at least three Hall elements, which are arranged on the measurement substrate such that areas of the Hall elements, which are sensitive to a magnetic field, extend in the measurement plane and/or form a part of the measurement plane, and that a virtual polygon, which is formed by the Hall elements, is rotated with respect to the measurement substrate such that the Hall elements are each located at an outer edge of the measurement substrate and have a distance to a center of an edge of the corresponding outer edge amounting to at maximum 25% of a total length of the corresponding outer edge, wherein
the Hall elements are, in an intended use of the circuit arrangement during the measurement, configured to respectively output an output signal, which corresponds to a magnetic field strength of a magnet to be detected; and
a processing electronic system, to which the output signals of the Hall sensors are delivered in the intended use of the circuit arrangement during the measurement.

20 Claims, 2 Drawing Sheets

(58) Field of Classification Search
CPC ........ G01P 3/4815; G01P 13/04; G01P 3/481;
G01P 3/48; G01B 7/30; G01R 1/16;
G01R 23/00; G06F 15/00
See application file for complete search history.

(56) References Cited

U.S. PATENT DOCUMENTS

| | | | |
|---|---|---|---|
| 2004/0189283 A1* | 9/2004 | Godoy | G01D 5/145 324/207.2 |
| 2006/0028204 A1* | 2/2006 | Oohira | G01D 5/145 324/207.25 |
| 2006/0066296 A1* | 3/2006 | Kuroyanagi | G01D 5/145 324/207.2 |
| 2008/0012522 A1* | 1/2008 | Wiegers | H02P 6/16 318/638 |
| 2010/0097051 A1* | 4/2010 | Bussan | G01D 5/145 324/207.21 |
| 2011/0184691 A1* | 7/2011 | Mehnert | G01D 5/145 702/151 |
| 2013/0015844 A1* | 1/2013 | Bogos | G01D 5/24452 324/207.2 |
| 2013/0015846 A1 | 1/2013 | Mehnert et al. | |
| 2013/0179115 A1* | 7/2013 | Friedrich | F16H 59/70 702/150 |
| 2013/0253864 A1* | 9/2013 | Fujita | G01R 33/0005 702/65 |
| 2014/0067301 A1 | 3/2014 | Mehnert et al. | |
| 2014/0225596 A1* | 8/2014 | Nakamura | G01R 33/07 324/207.2 |
| 2015/0022186 A1* | 1/2015 | Ausserlechner | G01D 5/145 324/207.2 |
| 2015/0159989 A1* | 6/2015 | Kim | G01R 33/072 324/207.2 |
| 2015/0377648 A1* | 12/2015 | Sirohiwala | G01D 5/145 324/207.2 |
| 2018/0168014 A1* | 6/2018 | Rivas | H05B 37/0227 |

* cited by examiner

INTEGRATED CIRCUIT ARRANGEMENT FOR A POSITION SENSOR USING HALL ELEMENTS

CROSS-REFERENCE TO RELATED APPLICATIONS

The present application claims the priorities of the German patent application no. DE 10 2015 218 651, filed Sep. 28, 2015, and of the German patent application no. DE 10 2015 117 067, filed Oct. 7, 2015, which are both incorporated herein by reference in their entirety.

FIELD OF THE INVENTION

The present invention relates to an integrated circuit arrangement for a position sensor, in particular for a position sensor for measuring angles or distances.

TECHNOLOGICAL BACKGROUND

The optical angle sensors, which have been developed to a high quality in the last decades, dominate the market place today. Their advantage rests in the high speed, which is increasingly inevitable in drive technology, as well as in the matured technology.

However, optical angle sensors are sensitive with respect to dirt of all kinds and are applicable only in a limited temperature range. Moreover, there are no absolute optical rotation counters, which can do without battery or gearing mechanism for the absolute counting.

Corresponding magnetic absolute position counters indeed do not have such limitations, but are less precise, though.

SUMMARY OF THE INVENTION

Against this background, there may be a need to achieve a contribution to increasing the precision of magnetic position sensors.

This objective may be satisfied by an integrated circuit arrangement according to patent claim 1 and a magnetic position sensor according to patent claim 11 which comprises such a circuit arrangement. Preferred embodiments are subject of the dependent claims.

According to an exemplary embodiment of the invention, an integrated circuit arrangement, which is embodied according to an aspect of the present invention, for a position sensor for measuring angles or distances comprises: (i) a measurement substrate, which defines a measurement plane and which is configured such that it comprises a plurality of corners, (ii) at least three Hall elements, which are arranged on the measurement substrate such that areas of the Hall elements, which are sensitive to a magnetic field, extend in the measurement plane or form a part of the measurement plane, and that a virtual polygon, which is formed by the Hall elements, is rotated with respect to the measurement substrate such that the Hall elements are each located at an outer edge of the measurement substrate and have a distance to a center of an edge of the corresponding outer edge amounting to at maximum 25%, 24%, 23%, 22%, 21%, 20%, 19%, 18%, 17%, 16%, 15%, 14%, 13%, 12%, 11% or 10% of a total length of the corresponding outer edge, wherein the Hall elements are, during an intended use of the circuit arrangement during the measurement, configured to output and/or provide respectively an output signal, which corresponds to a magnetic field strength of a magnet to be detected, and (iii) a processing electronic system, to which the output signals of the Hall elements are delivered in the intended use of the circuit arrangement during the measurement.

The alignment of the measurement substrate and the areas of the Hall elements that are sensitive to a magnetic field may be seen mathematically. Two vectors having the same origin may span the measurement plane. A plane, which may be spanned by the respective two circumferential edges, which may point in different directions, of the areas of the Hall elements, which may be sensitive to the magnetic field, may be identical to the measurement plane. That is, all the areas of the Hall elements, which may be sensitive to a magnetic field, may extend in the measurement plane and/or form a part of the measurement plane. Likewise, a substrate surface, on which the Hall elements may be arranged, may be at least parallel to the measurement plane.

The integrated circuit arrangement according to the invention may be conceived in particular for a position sensor, in which a magnet, particularly a permanent magnet, may move relative to the measurement substrate and the Hall elements arranged thereon. The measurement plane of the permanent magnet, which may move relative to the measurement substrate, may be aligned preferably parallel to the measurement substrate and/or the measurement plane.

Very particularly preferred, three, in particular four, Hall elements may be arranged on the measurement substrate. The Hall elements may concern quadrangular (having four contacts) or also octagonal (having eight contacts) Hall elements.

The measurement substrate may preferably be a silicon substrate, in which the Hall elements and the processing electronic system may be integrated for example in CMOS technology.

The processing electronic system may comprise particularly preferred one single multiplexer and one single amplifier, wherein the multiplexer may be configured to connect through the output signals which may be output from the Hall elements, selectively to the amplifier. Stated generally, the processing electronic system may be formed of a one-channel type (i.e. is one-channel), such that offset voltages and/or drifts of the amplifier, which may be caused by temperature, may affect the output signals of all Hall elements similarly.

The processing electronic system may preferably be implemented symmetrically, wherein this is to be understood such that the processing electronic system may be implemented in the measurement plane symmetrically such that line capacities may be present preferably symmetrised and/or symmetrical with respect to the Hall elements.

Further preferred, the integrated circuit arrangement may be implemented such that the output signals of the amplifier can be output to a specific circuitry, in particular to a micro-controller, for further processing.

In order to be able to process in a one-channel manner signals that are possibly (or according to circumstances) present simultaneously, the processing electronic system may further be provided with corresponding temporary data storages (or memories).

Preferably, the processing electronic system may additionally comprise a switching electronic for inverting and changing the connection and polarity of the contacts (current contacts and Hall voltage contacts) of the Hall elements, in order to thus enable the performing of a "spinning current" method.

By the arrangement of the Hall elements according to the invention in particular with the rotation of the spanned virtual polygon such that the Hall elements may not be at the corners of the measurement substrate but may have a distance to the center of the edge amounting to at maximum 25%, 24%, 23%, 22%, 21%, 20%, 19%, 18%, 17%, 16%, 15%, 14%, 13%, 12%, 11% or 10% of the total length of the corresponding outer edge, the mechanical tensions, which may occur more strongly at the corners of the measurement substrate—in particular for temperature variations—may influence the output signals of the Hall elements to a lesser extent, which may result in a higher precision of the output signals of the Hall elements and in a broader spectrum of applications regarding temperature loads of the circuit arrangement.

Preferably, the integrated circuit arrangement according to the invention may be implemented to the extent that a shortest distance between each Hall element and the corresponding outer edge is less than or equal to 300 μm, preferably less than or equal to 200 μm, more preferably less than or equal to 100 μm, more preferably less than or equal to 50 μm, more preferably less than or equal to 20 μm, or still more preferably less than or equal to 10 μm.

Further preferred, a number of the corners of the measurement substrate may be identical to the number of the corners of the virtual polygon.

The virtual polygon may be a regular polygon, in particular a square or an equilateral triangle.

Particularly preferable, the Hall elements may each be arranged at the center of the edge of the corresponding outer edge. Hereby, the corresponding Hall elements may have a maximum distance from the corners of the measurement substrate, at which larger mechanical tensions may occur, which may impair the precision.

The measurement substrate and the virtual polygon preferably each may have a triangular, preferably an equilateral triangular, shape, and the Hall elements may each be arranged on a median line of the corresponding edge of the triangular measurement substrate.

As an alternative to this, the measurement substrate and the virtual polygon each may have a quadrangular, preferably square, shape, and the Hall elements may each be arranged at the center of the edge of the corresponding outer edge of the quadrangular measurement substrate.

If the Hall elements are arranged on the triangular or quadrangular measurement substrate in this way, they may have, respectively, maximum distances from the corners and the respective greatest possible distance from each other, which may results, on the one hand, in an increase of the precision and on the other hand, if one works without field concentrator, in achieving sufficiently large (or strong) output signals of the Hall elements.

Further preferred, the integrated circuit arrangement according to the invention may be implemented to the extent that the Hall elements each may have a polygonal shape and are rotated with respect to the corresponding outer edge such that one corner of the respective Hall element may be facing the corresponding outer edge and that the shortest distance to the corresponding outer edge may run between the facing corner and the outer edge.

By this arrangement of the Hall elements, the influence of field inhomogeneities, which may be caused for example by temperature variations of the permanent magnet, may be reduced.

Very particularly preferred, the integrated circuit arrangement according to the invention may be implemented such that the Hall elements are each rotated with respect to the corresponding outer edge such that a diagonal, which may connect to corners of the polygon shape of the Hall elements, may be perpendicular to the corresponding outer edge.

Hereby, it may be achieved that the influences of the above-mentioned field inhomogeneities are minimized.

As mentioned above, the processing electronic system of the integrated circuit arrangement may comprise one single multiplexer and one single amplifier, wherein the multiplexer may be configured to connect through the output signals of the Hall element selectively to the amplifier.

According to another exemplary embodiment of the invention, and according to a further aspect of the invention, a position sensor for measuring angles or distances is provided, which sensor comprises an integrated circuit arrangement as has been explained in the preceding, wherein the circuit arrangement is provided with the multiplexer and the amplifier.

Furthermore, the position sensor may comprise at least one magnet, in particular a permanent magnet, which may be movable relative to the circuit arrangement, particularly parallel to the measurement plane, and a controller, in particular a micro-controller, which may be connected with the amplifier such that the amplifier can output an amplified output signal to the controller.

The controller may comprise a demultiplexer, which may be configured to connect through the amplified output signal to one of a plurality of outputs of the demultiplexer, wherein the controller may furthermore be configured to calculate the precise posture (or position) of the magnet and thereby its angular posture (or position) or its displacement with respect to a reference position on the basis of the amplified output signals, which may be output at the outputs of the demultiplexer.

The position sensor according to the invention may concern preferably such one, which can determine continuously a linear or a rotating movement of the magnet. Based on this, the position sensor may be capable to calculate a number of complete linear displacements or turns of the magnet, and a precise posture and/or angular position of the magnet with respect to a reference position. Insofar, an absolute position sensor may be concerned, which may be capable to calculate an absolute position (afore-mentioned number+precise posture and/or angular position) of the magnet from a combination of the afore-mentioned number and the precise posture and/or angular posture of the magnet. According to intended use, the magnet of the absolute position sensor may be attached to an object to be monitored, whereby thus the numbers of complete linear displacements/turns of the object and, in addition, the precise posture and/or angular posture of the object can be calculated. At least one value of the number of complete displacements or turns can be stored in a non-volatile memory.

Preferably, the controller or the processing electronic system of the integrated circuit arrangement may comprise an A/D converter, which may be configured to convert the output signal of the amplifier to a digital signal, and to output this for further processing by the controller.

The controller, in particular a micro-controller, may preferably have, in the case, in which octagonal Hall elements are used, a processing speed, which may allow an acceleration of the object to be monitored of at least $1*10^5$ $s^{-2}$, in particular in the case of rotations $1*10^5$ rad/$s^{-2}$ and in the case of linear displacements $1*10^5$ m/$s^{-2}$. Alternatively, the controller can preferably also have a processing speed, which may allow the calculation of the absolute position (number+precise posture and/or angular posture) of the magnet within less than or equal to 10 μs.

The position sensor according to the invention, in a non-autonomous mode, may preferably be supplied by a connected external energy source. In this mode, the number of linear displacements/turns and the precise posture/angular posture of the permanent magnet can be continuously calculated by the processing of the output signals of the at least three, preferably four, Hall elements by the micro-controller, whereby the absolute position of the magnet and/or the object provided with the magnet may be available continuously and absolutely.

Preferably, the micro-controller can process the output signals of the Hall elements, particularly in the case, in which four Hall elements are conceived, according to the difference principle and ratiometrically, in order to eliminate additive and multiplicative noise variables.

For the purpose that the absolute position sensor according to the invention is capable to sample (or detect) the number of turns of the magnet or the number of specified displacements of the magnet also in an autonomous mode, in which no external energy source is available, and in order to be capable to determine from this, after switching into the non-autonomous mode, again the absolute position of the magnet and/or of the object, the position sensor may be provided preferably with at least one, preferably two additional Hall elements and one Wiegand module that may suppliy [with energy] the additional Hall elements.

During the movement of the magnet, the Wiegand module may provide alternatingly oppositely polarized voltage pulses, which may be rectified via a rectifier and, subsequent to the rectifying, may be used for charging a capacitor. During the autonomous mode, the additional Hall elements may be supplied with energy that may be stored in the capacitor. The output signals of the preferably two additional Hall elements may be output to the micro-controller after amplification.

The micro-controller may be configured to determine the number of turns or the number of specified linear displacements on the basis of the amplified output signals of the additional Hall elements, and to store it in a non-volatile memory, for example a FRAM.

The output signals of the two additional Hall elements may be processed according to the difference principle, or the two additional Hall elements may be connected according to the difference principle, i.e. magnetic noise fields, which may permeate the two additional Hall elements in the same direction (or equally oriented), may be eliminated by summation.

In addition, the position sensor may comprise a field concentrator. Such a field concentrator may be formed from a material having a high permeability, and may be arranged such that the magnetic field generated by the magnet may be deflected and may permeate the measurement plane, in which the Hall elements are arranged, at least in part perpendicularly.

In particular, in the case of a position sensor that determines rotations of the magnet, the field concentrator may be arranged such that it rotates together with the magnetic field. Hereby, hysteresis jumps (or hysteresis steps), which may result in a loss of precision of the output signals of the Hall elements, may be avoided.

In the position sensor according to the invention, the integrated circuit arrangement may be arranged in particular such that the measurement substrate is kept free of tension as much as possible.

BRIEF DESCRIPTION OF THE DRAWINGS

In the following, preferred embodiments of the invention are still explained with reference to the figures.

DETAILED DESCRIPTION OF EXEMPLARY EMBODIMENTS

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Figure 1A:
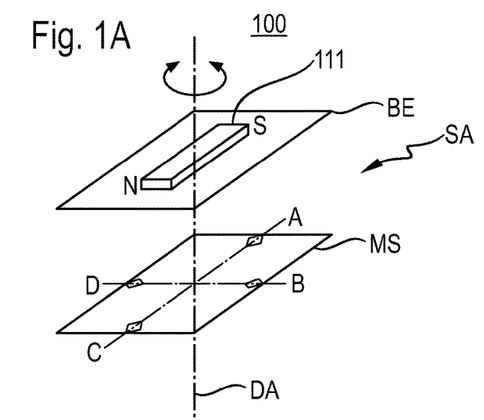
FIG. 1A illustrates schematically a first preferred embodiment of a position sensor according to the invention, which is configured to determine an angular posture of a rotating permanent magnet.

FIG. 1A illustrates schematically a position sensor 100 according to the invention, in particular an absolute fine position sensor according to the invention.

The position sensor 100 may comprise a permanent magnet 111, which may be pivot-mounted (or supported rotatably), wherein it may lie in a movement plane BE, such that its north pole N and its south pole S can rotate around a rotation axis DA. The movement plane BE of the permanent magnet 111 is drawn schematically in FIG. 1A, and may be perpendicular to the rotation axis DA.

Preferably, the permanent magnet 111 may be embodied as a rectangular-shaped bar magnet having a constant thickness. This shape of the permanent magnet 111 may provide in particular for a favourable field symmetry and field homogeneity at the Hall elements A, B, C, D to be explained in the following. Though, the permanent magnet 111 may also have another shape, such as for example a square, elliptic or circular shape, of respectively a same thickness.

Depending on the application, the permanent magnet 111 may be attached to an object to be monitored, which may cause the rotation of the permanent magnet 111 around the rotation axis DA. The object may concern for example a shaft.

The position sensor 100 according to the first preferred embodiment of the invention may comprise, besides the permanent magnet 111, also an integrated circuit arrangement SA according to the invention, which is explained in the following.

The circuit arrangement SA may comprise a measurement substrate MS, on which the four Hall elements A, B, C, D as well as a processing electronic system (not shown) may be arranged and/or integrated.

The measurement substrate MS may run in a measurement plane ME (not drawn), which may extend parallel to the movement plane BE of the permanent magnet 111, wherein the measurement substrate may be implemented stationary and supported such that the permanent magnet 111 can rotate with respect to the measurement substrate MS.

The four Hall elements A, B, C, D may be arranged on the measurement substrate MS axially symmetrical to the rotation axis DA, wherein their active areas that are sensitive to a magnetic field may run in the measurement plane ME and/or may be located on the surface of the measurement substrate MS. The measurement substrate MS may preferably be a silicon substrate, in which the Hall elements A, B, C, D as well as the processing electronic system may be integrated for example in CMOS technology.

The output signals of the four Hall elements A, B, C, D may be output to a processing electronic system, which is not illustrated but is explained in the following with reference to FIG. 6. The amplitudes of the output signals may be depending on the strength of the magnetic field, which may permeate the active areas of the Hall elements A, B, C, D, in particular [depending] on the components of the magnetic field, which may permeate the measurement substrate MS perpendicularly.

If the permanent magnet 111 and/or the object provided therewith rotates, the magnetic field of the permanent magnet 111, which permeates the active areas of the four Hall elements A, B, C, D, may vary such that the precise angular posture of the permanent magnet 111 with respect to a reference position can be determined from the output signals [of the Hall elements]. Such a position sensor, as explained in the preceding, may generally also be referred to as a single-turn sensor.

In the position sensor 100, the signal strength (amplitude) of the output signals provided by the Hall elements A, B, C, D may increase with their mutual distance.

Figure 1B:
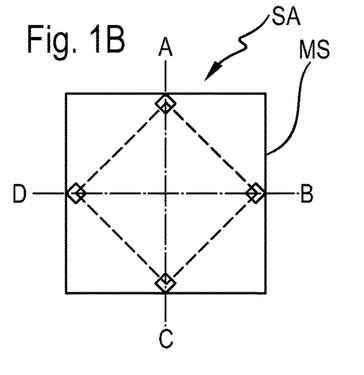
FIG. 1B illustrates schematically a preferred embodiment of a measurement substrate of the position sensor according to the invention in a plan view.

In FIGS. 1A and 1B, the basic composition of the circuit arrangement SA can be seen, such as it may be applied in the first preferred embodiment of the position sensor according to the invention. The processing electronic system, which may be arranged on the measurement substrate MS, is not illustrated in the FIGS. 1A and 1B.

The measurement substrate MS of the circuit arrangement SA may be composed quadratically and thus may have four corners. Regarding the signal strengths of the output signals provided by the Hall elements A, B, C, D, an arrangement of the Hall elements in the four corners would be optimum.

Though, the Hall elements A, B, C, D, which may each be implemented square-shaped and may have four contacts, may be arranged such that they may respectively be arranged at an outer edge of the measurement substrate MS and may span a virtual square, which may be rotated with respect to the square-shaped measurement substrate MS. The virtual square, which may be spanned by the Hall elements A, B, C, D, may be rotated in particular with respect to the square-shaped measurement substrate MS such that the Hall elements A, B, C, D are not arranged in the corners of the measurement substrate.

Preferably, the Hall elements may be at a distance from the respective center of the edge by at maximum 25%, 24%, 23%, 22%, 21%, 20%, 19%, 18%, 17%, 16%, 15%, 14%, 13%, 12%, 11% or 10% of the total length of the corresponding outer edge. In the embodiment of the circuit arrangement SA illustrated in the FIGS. 1A and 1B, the Hall elements A, B, C, D may be arranged precisely at the center of the edge of the respective outer edge of the measurement substrate. Regarding the signal strengths of the output signals, an arrangement of the Hall elements at the corners would be better, however, the distance of the Hall elements, which may be lower by the square root factor, may be without (or of less) importance, in particular against the background, that by this arrangement, the precision of the position sensor can be increased and that at present almost all position sensors may compris a field concentrator, and moreover the amplifier quality may be improved.

The reason for the arrangement explained above is that the influence of mechanical tensions, which may occur increasedly in the corners of the measurement substrate, can be minimized. Mechanical tensions may occur, for example, during temperature variations and may result in non-predictable offset voltages of the output signals of the Hall elements A, B, C, D, which cannot be eliminated even with the spinning current method that is to be explained later, and thus may result in a reduced precision of the position measurement.

According to the invention, the Hall elements A, B, C, D are therefore arranged not at the corners of the measurement substrate MS, but, as illustrated, may be arranged along the corresponding outer edge at the respective center of the edge, where the influence of mechanical tensions may be lower. By this arrangement, sufficiently large distances between the Hall elements can be achieved, with simultaneous increase of the precision and/or reduction of the influence of mechanical tensions.

Figure 1C:
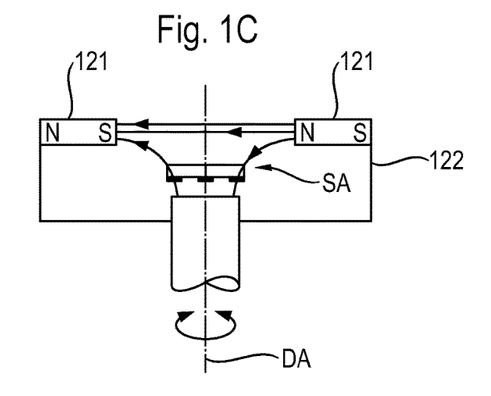
FIG. 1C illustrates a preferred implementation of an inventive position sensor according to the first preferred embodiment of the invention.

The smaller signal strength, which may be caused by the reduced distance between the Hall elements A, B, C, D, can also be compensated in that the position sensor 100 may be constructed according to FIG. 1C. An according composition is known from the patent document DE 10 2010 022 154 and is therefore explained only in the relevant properties.

This variant may comprise two permanent magnets 121, which may be supported by a back iron body 122 attached to a shaft W. The shaft W may be pivot-mounted (or supported rotatably) for rotating about a rotation axis DA, wherein the back iron body 122 may be attached to the shaft W such that, upon rotation of the shaft W, it may rotate together with the shaft W likewise around the rotation axis DA.

The two permanent magnets 121 may be supported by the back iron body 122—symmetrically to the rotation axis DA—diametrically to the shaft W, wherein opposite poles of the permanent magnets 121 may be facing each other. The magnetic field of the two permanent magnets 121 may extend among others between the opposite poles that may be facing each other, i.e. from the north pole N of the right permanent magnet 121 shown in FIG. 1C to the south pole S of the left permanent magnet 121 shown in FIG. 1C.

The shaft W may be formed from a ferromagnetic material, and may act as a field concentrator in this variant. As is shown in FIG. 1C, the components of the magnetic field, which may be facing the shaft W, may be deflected by the shaft W acting as the field concentrator.

The circuit arrangement SA may be identical to the one indicated in FIG. 1A and may be arranged at a slight distance from the front side of the shaft W, such that the measurement substrate MS of the circuit arrangement SA may be permeated by the deflected magnetic field components.

When the shaft W rotates, the permanent magnets 121 may be put in rotation together with the shaft W, whereby there may result a relative movement between the permanent magnets 121 and the circuit arrangement SA.

The absolute precise angular posture of the shaft W may be determined on the basis of the output signals of the Hall elements A, B, C, D.

Particularly preferable in this variant may be the common rotation of the permanent magnets 121 and the field concentrator, because hereby, on the one hand, good signal strengths of the output signal can be achieved, with the explained simultaneous increase of the precision, and, on the other hand, hysteresis jumps, which would reduce the precision, in the output signals and/or in the measurement value of the ultimately determined angular posture of the shaft, which would occur in the case of a relative movement between the permanent magnets 121 and the field concentrator, can be avoided.

Figure 2:
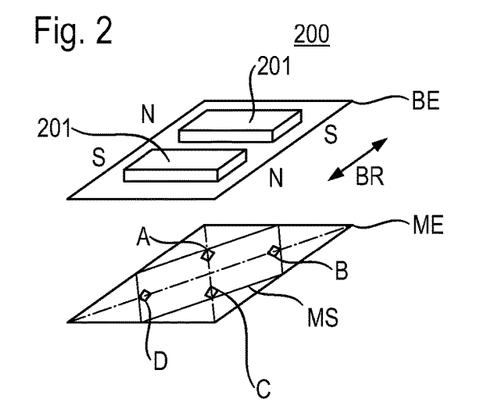
FIG. 2 illustrates schematically a second preferred embodiment of a position sensor according to the invention, which is configured to determine a distance of a linear displacement of a permanent magnet arrangement.

A second preferred embodiment of a position sensor 200 according to the invention is shown in FIG. 2. This one differs from the one explained with reference to the FIGS. 1A to 1C in that the position sensor 200 is capable to detect a linear displacement of a permanent magnet arrangement 201 and/or an object provided with this permanent magnet arrangement 201.

The permanent magnet arrangement 201 may comprise at least two permanent magnets, which may be aligned perpendicularly to the movement direction BR, wherein the polarities of the two permanent magnets may be respectively opposite to each other.

The position sensor 200 may also comprise a circuit arrangement SA, which may be identical to the circuit arrangement SA of FIGS. 1A to 1C. In the position sensor 200, the measurement substrate MS may be rotated in the measurement plane such that the Hall elements A, B and/or C, D are located respectively on a virtual straight line with respect to the movement direction BR, which [straight line] may be perpendicular to the movement direction and/or parallel to the alignment axes (north pole-south pole-axes) of the permanent magnets.

When the permanent magnet arrangement 201 moves in the movement plane BE along the shown movement direction BR, this may result in a change of the magnetic field, which may be experienced and/or detected by the Hall elements A, B and/or C, D.

On the basis of the output signals of the Hall elements A, B, C, D, the precise value of the distance of the linear displacement of the permanent magnet arrangement 201 with respect to the stationary circuit arrangement SA can be determined.

As can be seen from the FIGS. 1A, 1B and 2, the Hall elements A, B, C, D may be implemented quadrangularly, generally polygonally, wherein each side may have a contact. The Hall elements shown may thus be provided with four contacts, wherein two contacts may form the current contacts and the remaining two may form the Hall voltage contacts.

The Hall elements A to D may not only be arranged at the center of the edges, but, moreover, may also be rotated with respect to the corresponding outer edge such that a diagonal, which connects two corners of the Hall elements A, B, C, D, may be perpendicular to the respective outer edge of the measurement substrate MS. Stated differently, the diagonals may run on the perpendicular bisector of the corresponding outer edges.

This arrangement of the Hall elements may be favourable in particular in cases, where an inhomogeneity of the magnetic field of the permanent magnet/s 111, 121, 201 due to temperature variations may be expected. The corresponding influence on the measurement signal at the (flat) maximum thereof may then be at minimum.

Figure 3:
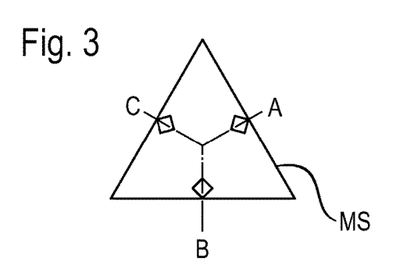
FIGS. 3 and 4 illustrate schematically further preferred embodiments of integrated circuit arrangements according to the invention.

FIG. 3 illustrates a varied embodiment of the circuit arrangement SA according to the invention, which can be applied in a position sensor 100 according to the first preferred embodiment. The measurement substrate MS of the corresponding circuit arrangement SA may form an equilateral triangle, wherein the Hall elements A, B, C may also be arranged at the outer edges and in the corresponding center of the edge. Each of the Hall elements A, B, C may be rotated with respect to the corresponding outer edge in the same manner as the Hall elements in FIGS. 1A and 1C. Again, the processing electronic system is not shown.

Figure 4:
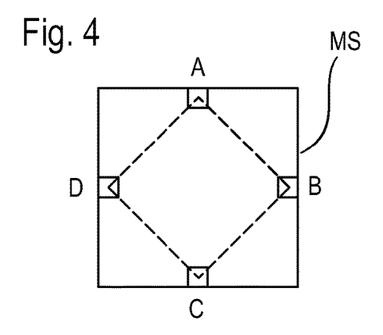

FIG. 4 shows a further varied embodiment of the circuit arrangement, which can be applied in a position sensor according to the first or second preferred embodiment.

This embodiment may differ from the one shown in FIG. 1B only in that the Hall elements may not be rotated with respect to the respective center of edge (and/or outer edge).

Figure 5:
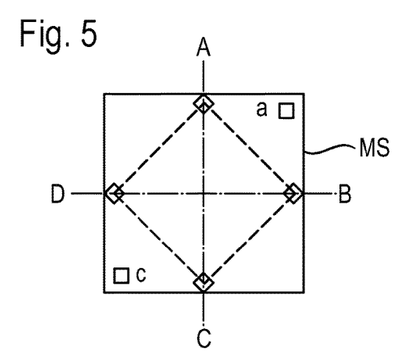
FIG. 5 shows schematically the measurement substrate of FIG. 1C, wherein two additional Hall elements are conceived for counting the number of turns, which [Hall elements] are supplied with energy by a Wiegand module in an autonomous mode of the position sensor according to the first preferred embodiment.

Finally, FIG. 5 illustrates still a preferred embodiment of the circuit arrangement of FIG. 1B. This circuit arrangement SA may comprise, further to the Hall elements A to D, still two further Hall elements a, c. These additional Hall elements a, c may be used in cases, where the circuit arrangement according to the invention may be used for a position sensor 100 according to the first preferred embodiment and where the position sensor 100 may have to take over, besides the function of measuring the absolute precise angular posture, also the function of an absolute rotation counter. Such a position sensor, which may take over both functions, is generally also referred to as a multiturn (or multiturn sensor), and is known for example from the document DE 10 2007 039 051. The two additional Hall elements a, c may be provided with energy by a Wiegand module, as will be explained still in the following.

Because only the polarity of the magnetic field of the permanent magnet/s 111, 121 is to be determined via/by the two additional Hall elements a, c, by comparing their output signals with a voltage threshold, their position may have a subordinate importance. Therefore, they can be arranged in the corners of the measurement substrate MS.

Figure 6:
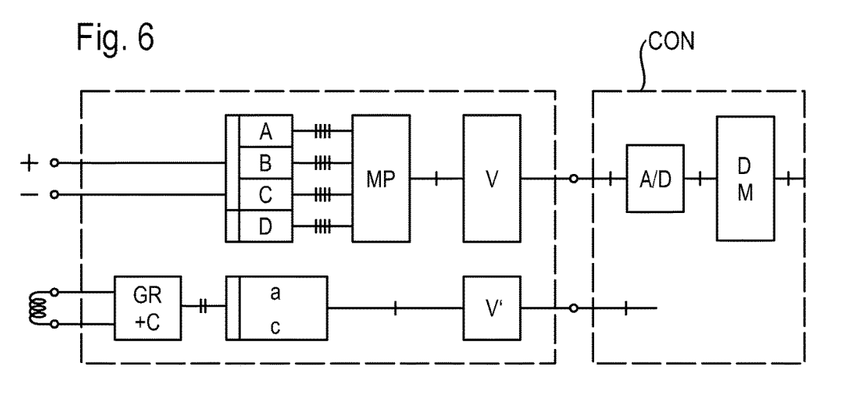
FIG. 6 illustrates schematically the composition of a processing electronic system arranged on the measurement substrate as well as the connection of the processing electronic system with a micro-controller.

With reference to FIG. 6, the composition of the processing electronic system, which may be arranged on the measurement substrate MS, as well as the composition of a micro-controller connected with the circuit arrangement, are still explained in the following.

In particular, in FIG. 6, a processing electronic system is shown, which may be conceived for the embodiment of the circuit arrangement having four Hall elements A, B, C, D. The four Hall elements A, B, C, D can be connected to an external energy supply (+−), as shown, which may supply the Hall elements A, B, C, D preferably continuously with energy. In the case of an external energy supply, the position sensor may reside in a non-autonomous mode.

The processing electronic system may include a multiplexer MP and an amplifier V. Each of the four Hall elements A, B, C, D may be connected with the multiplexer MP via four signal lines, wherein the multiplexer may be configured to connect through the signals coming from the Hall elements A, B, C, D selectively to the amplifier V. The amplifier V may deliver the accordingly amplified output signal to a micro-controller CON, which may be connected to the circuit arrangement SA according to the invention and which may comprise among others an A/D converter and a demultiplexer DM.

The A/D converter may convert the amplified analog output signal, which may be output from the amplifier V, to a digital signal and outputs this to the demultiplexer DM, which in turn may be configured to connect through the digital signal selectively to one of its outputs.

The micro-controller CON may be embodied and programmed such that it may be capable to calculate the precise angular posture and/or distance of the linear displacement of the permanent magnet/s 111, 121, 201 on the basis of the output signals of the demultiplexer DM.

By this construction, the processing electronic system may be composed insofar with only one single multiplexer MP and one single amplifier V in a one-channel manner, wherein this one-channel implementation may continue in the micro-controller CON via/by the A/D converter and the demultiplexer DM. The one-channel embodiment of the circuit arrangement SA with only one single multiplexer MP and one single amplifier V may be particularly advantageous for obtaining a high precision, because offset voltages and/or drifts can affect all signals similarly and can be eliminated.

Preferably, the micro-controller CON may furthermore be embodied and programmed such that it may be capable to perform a series of different methods.

In the case, where the realized position sensor concerns one according to the first preferred embodiment, the output signals of the Hall elements A, C and B, D may, for example, be processed according to the difference principle. By this is to be understood, that the output signals of the Hall elements A and C, which are based on magnetic field components, which are directed opposite to each other, add [to each other], whereas output signals of the Hall elements A and C, which are based on equally oriented magnetic field components, which originate from magnetic noise fields, are subtracted and thus cancel each other. The same may hold for the Hall elements B and D. Insofar as the additional Hall elements a, c are conceived, the output signals thereof may also be processed according to the difference principle.

In the other case, where the position sensor concerns one according to the second preferred embodiment of the invention, the output signals of the Hall elements A and B and/or C and D may be processed according to the explained difference principle.

Additive noise variables can be eliminated by the processing according to the difference principle. Preferably, the micro-controller CON is also configured to process the signals ratiometrically, whereby multiplicative noise variables can also be eliminated.

Furthermore, the micro-controller is capable to perform a "spinning current" method. Hereby, on the one hand, the two contacts acting as the current contacts may be exchanged with the two Hall voltage contacts for each of the Hall elements A, B, C, D, and, on the other hand, for each of the two interconnections (or connectivies) also the polarities may each be exchanged once. Insofar, four output signals may result for each of the Hall elements A, B, C, D. Sum signals may be formed from these four output signals, in which offset voltages that may be caused by mechanical tensions may occur hardly still.

A switching electronic for switching the current contacts and/or the Hall voltage contacts may also be arranged on the measurement substrate MS, and may be controlled by the micro-controller. The switching electronic is not shown in FIG. 6.

The position sensors 100, 200, which are explained in the preceding, may preferably also determine the number of turns (or revolutions) of the permanent magnets 111, 121 and/or the number of complete linear displacements of the permanent magnet arrangement 201 on the basis of the outputs of the Hall elements A, B, C, D, and preferably may store the determined value in a non-volatile memory. Insofar, the position sensors 100, 200 may be capable to determine the positions of the permanent magnets 111, 121 and/or of the permanent magnet arrangement 201 absolutely. A prerequisite for this is that the external energy supply is not interrupted.

In the case of a discontinuation of the external energy supply, the position sensor may pass over to an autonomous mode. In order to provide that at least in the position sensor 100 according to the first preferred embodiment the number of rotations can be determined also in the case of a discontinuation of the external energy supply, the position sensor 100 according to the invention may include a circuit arrangement according to FIG. 5 having the two additional Hall elements a, c and a Wiegand module WM. During the rotation of the permanent magnet/s 111, 121, the Wiegand module WM may provide voltage pulses, which may be rectified through a rectifier GR and charge a capacitor+C, which may be conceived among others for supplying the additional Hall elements a, c.

For the evaluation of the output signals of the additional Hall elements a, c, the processing electronic system may further include an additional amplifier V', which may amplify the output signals of the additional Hall elements a, c and may output these to the micro-controller CON. Preferably, the output signals of the additional Hall elements a, c may also be processed according to the difference principle.

The micro-controller CON may be configured to count the number of rotations (or turns) of the permanent magnet/s 111, 121 on the basis of the output signals of the additional Hall elements a, c, and to store the corresponding value in a non-volatile memory. After the external energy supply is available again, the micro-controller CON may be capable to bring together the corresponding value with a newly determined, precise angular position. In addition, the microcontroller can be configured to deactivate all the components, which may not be necessary for the respective function (autonomous mode/non-autonomous mode), in order to save energy.

The invention claimed is:

1. An integrated circuit arrangement for a position sensor for measuring angles of or distances to an object, the integrated circuit arrangement comprising:
   a measurement substrate that defines a measurement plane and including a plurality of corners;
   at least three Hall elements that are sensitive to a magnetic field and located on the measurement substrate such that areas of the at least three Hall elements extend in the measurement plane or form a part of the measurement plane, the at least three Hall elements forming a virtual polygon that is rotated with respect to the measurement substrate such that the at least three Hall elements are each located at an outer edge of the measurement substrate and such that each of the at least three Hall elements is located a distance from a center of a corresponding outer edge of the measurement substrate, the distance amounting to no more than 25% of a total length of the corresponding outer edge, wherein
   the at least three Hall elements are configured to respectively output an output signal that corresponds to a magnetic field strength of a magnet;
   a processing electronic system that receives the output signals and measures the angles or distances; and two additional Hall elements located at opposing corners of the measurement substrate to sense rotations of the magnet, wherein the at least three Hall elements each have a polygonal shape and are rotated with respect to the corresponding outer edges such that a corner of a respective Hall element is facing the corresponding outer edge.

2. The integrated circuit arrangement according to claim 1, wherein a shortest distance between each of the at least three Hall elements and the corresponding outer edge is less than or equal to 300 μm.

3. The integrated circuit arrangement according to claim 2, wherein the shortest distance to the corresponding outer edge runs between the facing corner and the corresponding outer edge.

4. The integrated circuit arrangement according to claim 3, wherein the at least three Hall elements are rotated with respect to the corresponding outer edge such that a line that connects two corners of the polygonal shape is perpendicular to the corresponding outer edge.

5. The integrated circuit arrangement according to claim 1, wherein a number of the corners of the measurement substrate is identical to a number of corners of the virtual polygon.

6. The integrated circuit arrangement according to claim 1, wherein the virtual polygon is a regular polygon.

7. The integrated circuit arrangement according to claim 1, wherein each of the at least three Hall elements is located at the center of the corresponding outer edge.

8. The integrated circuit arrangement according to claim 1, wherein the measurement substrate and the virtual polygon each have a triangular shape, and the at least three Hall sensors are each arranged on a median line of the corresponding outer edge of the triangular measurement substrate.

9. The integrated circuit arrangement according to claim 1, wherein the at least three Hall elements include four Hall elements, wherein the measurement substrate and the virtual polygon each have a quadrangular shape, and the at least three Hall elements are each arranged at the center of the corresponding outer edge of the quadrangular measurement substrate.

10. The integrated circuit arrangement according to claim 1, wherein:

the processing electronic system comprises one single multiplexer and at least one amplifier; and the multiplexer is configured to selectively output the output signals of the at least three Hall elements to the at least one amplifier.

11. A position sensor comprising:

an integrated circuit arrangement including:

a measurement substrate that defines a measurement plane and including a plurality of corners;

at least three Hall elements that are sensitive to a magnetic field and located on the measurement substrate such that areas of the at least three Hall elements extend in the measurement plane or form a part of the measurement plane, the at least three Hall elements forming a virtual polygon that is rotated with respect to the measurement substrate such that the at least three Hall elements are each located at an outer edge of the measurement substrate and such that each of the at least three Hall elements is located a distance from a center of a corresponding outer edge of the measurement substrate the distance amounting to no more than 25% of a total length of the corresponding outer edge, wherein the at least three Hall elements are configured to respectively output an output signal that corresponds to a magnetic field strength;

a processing electronic system that receives the output signals and measures angles of or distances to an object; and two additional Hall elements located at opposing corners of the measurement substrate;

a magnet movable in a movement plane relative to the integrated circuit arrangement, the movement plane running parallel to the measurement plane and which is movable relative to the integrated circuit arrangement, wherein the two additional Hall elements sense rotations of the magnet; and a controller connected to an amplifier such that the amplifier outputs an amplified output signal to the controller, the controller including a demultiplexer configured to receive the amplified output signal to output of a plurality of outputs; wherein the controller is configured to calculate a posture of the magnet on a basis of the plurality of outputs, wherein the integrated circuit arrangement includes:

a Wiegand module that generates voltage pulses based on the rotations of the magnet;

a rectifier coupled to the Wiegand module that rectifies the voltage pulses; and a capacitance coupled between the rectifier and the two additional Hall elements and that stores charge according to the rectified voltage pulses to supply power to the two additional Hall elements.

12. The position sensor according to claim 11, wherein a shortest distance between each of the at least three Hall elements and the corresponding outer edge is less than or equal to 300 μm.

13. The position sensor according to claim 12, wherein the at least three Hall elements each have a polygonal shape and are rotated with respect to the corresponding outer edges such that a corner of a respective Hall element is facing the corresponding outer edge and that the shortest distance to the corresponding outer edge runs between the facing corner and the outer edge.

14. The position sensor according to claim 13, wherein the at least three Hall elements are rotated with respect to the corresponding outer edge such that a line that connects two corners of the polygonal shape is perpendicular to the corresponding outer edge.

15. The position sensor according to claim 11, wherein a number of the corners of the measurement substrate is identical to a number of corners of the virtual polygon.

16. The position sensor according to claim 11, wherein the virtual polygon is a regular polygon.

17. The position sensor according to claim 11, wherein each of the at least three Hall elements is located at the center of the corresponding outer edge.

18. The position sensor according to claim 11, wherein the measurement substrate and the virtual polygon each have a triangular shape, and the at least three Hall sensors are each arranged on a median line of the corresponding outer edge of the triangular measurement substrate.

19. The position sensor according to claim 11, wherein the at least three Hall elements include four Hall elements, wherein the measurement substrate and the virtual polygon each have a quadrangular shape, and the four Hall elements are each arranged at the center of the corresponding outer edge of the quadrangular measurement substrate.

20. An integrated circuit arrangement for a position sensor for measuring angles of or distances to an object, the integrated circuit arrangement comprising:

a measurement substrate that defines a measurement plane and including a plurality of corners;

at least three Hall elements that are sensitive to a magnetic field and located on the measurement substrate such that areas of the at least three Hall elements extend in the measurement plane or form a part of the measurement plane, the at least three Hall elements forming a virtual polygon that is rotated with respect to the measurement substrate such that the at least three Hall elements are each located at an outer edge of the measurement substrate and such that each of the at least three Hall elements is located a distance from a center of a corresponding outer edge of the measurement substrate, the distance amounting to no more than 25% of a total length of the corresponding outer edge, wherein the at least three Hall elements are configured to respectively output an output signal that corresponds to a magnetic field strength of a magnet;

a processing electronic system that receives the output signals and measures the angles or distances;

two additional Hall elements located at opposing corners of the measurement substrate and that sense rotations of the magnet, wherein the processing electronic system includes a first amplifier and a second amplifier, the first amplifier amplifying signals that are based on the output signals, the second amplifier amplifying a signal that is based on outputs of the two additional Hall elements;

a Wiegand module that generates voltage pulses based on the rotations of the magnet;

a rectifier coupled to the Wiegand module that rectifies the voltage pulses; and a capacitance coupled between the rectifier and the two additional Hall elements and that stores charge according to the rectified voltage pulses to supply power to the two additional Hall elements.

* * * * *